US010076975B2

(12) United States Patent
Jacobson et al.

(10) Patent No.: US 10,076,975 B2
(45) Date of Patent: Sep. 18, 2018

(54) BRAKE RELEASE FOR AIRCRAFT SEAT (71) Applicant: Goodrich Corporation, Charlotte, NC (US)

(72) Inventors: Rob Jacobson, Marinette, WI (US); Kenneth J Davis, Menominee, MI (US)

(73) Assignee: GOODRICH CORPORATION, Charlotte, NC (US)

(*) Notice: Subject to any disclaimer, the term of this patent is extended or adjusted under 35 U.S.C. 154(b) by 79 days.

(21) Appl. No.: 15/234,292

(22) Filed: Aug. 11, 2016

(65) Prior Publication Data
US 2018/0043798 A1 Feb. 15, 2018

(51) Int. Cl.
B60N 2/00 (2006.01)
B60N 2/08 (2006.01)
B64D 11/06 (2006.01)
B60N 2/06 (2006.01)
B60N 2/14 (2006.01)

(52) U.S. Cl.
CPC ........... B60N 2/0881 (2013.01); B60N 2/062 (2013.01); B60N 2/08 (2013.01); B60N 2/146 (2013.01); B64D 11/0639 (2014.12); B64D 11/0648 (2014.12)

(58) Field of Classification Search
CPC .................. B60N 2/0881; B60N 2/443; B60N 2002/4425; B64D 11/0639; B64D 11/064; F16D 65/28; F16D 2121/24
USPC ......... 248/429; 188/31, 68, 70 R, 82.7, 265; 267/131, 133; 297/463.1, 463.2, 464, 297/473, 483
See application file for complete search history.

(56) References Cited

U.S. PATENT DOCUMENTS

| 1,941,158 | A | 12/1933 | Spinetta | |
|---|---|---|---|---|
| 5,161,765 | A | 11/1992 | Wilson | |
| 5,520,362 | A * | 5/1996 | Gerlach | B60N 2/0705 248/429 |
| 6,691,970 | B1 * | 2/2004 | Sutton, Sr. | B60N 2/062 248/425 |
| 7,108,325 | B2 | 9/2006 | Williamson et al. | |
| 7,748,778 | B1 | 7/2010 | Udriste et al. | |
| 9,493,242 | B2 * | 11/2016 | Oleson | B64D 11/06 |
| 9,751,435 | B1 * | 9/2017 | Davis | B60N 2/443 |
| 2006/0108848 | A1 | 5/2006 | Willliamson et al. | |

OTHER PUBLICATIONS

Extended European Search Report dated Dec. 15, 2017 in European Application No. 17184360.0.

* cited by examiner

Primary Examiner — Anita M King
(74) Attorney, Agent, or Firm — Snell & Wilmer L.L.P.

(57) ABSTRACT

A brake release may comprise a pulley frame including a fixed portion and a pivoting arm. A first pulley may be coupled to the pivoting arm of the pulley frame. A second pulley may be coupled to the fixed portion of the pulley frame. A cable may be disposed around the first pulley and the second pulley and may be coupled to a first brake and a second brake. A main lever arm may be coupled to the pivoting arm of the pulley frame. The main lever arm may be configured to move the first pulley away from the second pulley and to pull the cable to release the first brake and the second brake.

16 Claims, 9 Drawing Sheets

BRAKE RELEASE FOR AIRCRAFT SEAT

FIELD

The present disclosure relates to vehicle interior fixtures, and, more specifically, to brake release mechanisms for aircraft cabin seats.

BACKGROUND

Aircraft cabin seats may rotate and articulate. Aircraft cabin seats may permit forward and aft translation, lateral translation, and rotational motion. Occupants often desire to arrest seat translation or lock the seat in a particular position. Conventional seat brake mechanisms tend to have several cables and brackets that make poor use of the limited space within a seat.

SUMMARY

Systems for brake release for aircraft cabin seats are disclosed herein. A brake release may comprise a pulley frame including a fixed portion and a pivoting arm. A first pulley may be coupled to the pivoting arm of the pulley frame. A second pulley may be coupled to the fixed portion of the pulley frame. A cable may be disposed around the first pulley and the second pulley and may be coupled to a first brake and a second brake. A main lever arm may be coupled to the pivoting arm of the pulley frame. The main lever arm may be configured to move the first pulley away from the second pulley and to pull the cable to release the first brake and the second brake.

In various embodiments, the brake release may further include a bearing coupled to the main lever arm. The bearing may be coupled to the pivoting arm by a first actuation cable. The first actuation cable may be configured rotate the pivoting arm and move the first pulley. The bearing may be coupled to a third brake by a second actuation cable. The main lever arm may be configured to release the third brake by pulling the second actuation cable. The brake release may further include a third pulley. The cable may be disposed around the third pulley. The cable may be configured move around the first pulley, the second pulley and the third pulley.

A seat track assembly is also provided. The seat track assembly may comprise a first rail disposed in parallel to a second rail. A first brake may be coupled to the first rail. A second brake may be coupled to the second rail. A brake release may be coupled to the first brake and the second brake. The brake release may include a pulley assembly including a pivoting arm. The brake release may further include a cable disposed through the pulley assembly and coupled to the first brake and the second brake. The brake release may further include a main lever arm coupled to the pivoting arm. The main lever arm may be configured to increase tension in the cable to release the first brake and the second brake.

In various embodiments, the seat track assembly may further include a third rail disposed perpendicularly to the first rail and the second rail. A third brake may be coupled to the third rail. The brake release is coupled to the third brake and wherein the main lever arm is configured to release the third brake. The pulley assembly may include a first pulley and a second pulley with the cable disposed around the first pulley and the second pulley. The main lever arm may be configured to move the first pulley away from the second pulley to increase tension in the cable. The cable may be configured to translate through the pulley assembly in a first direction. At least one of the first brake or the second brake may comprise a linear brake.

A seat base for an aircraft seat is also provided. The seat base may comprise a seat track assembly slidably coupled to a leg base assembly. The seat track assembly may include a first rail disposed in parallel to a second rail. The seat track assembly may be configured to translate along the first rail and the second rail in a first direction with respect to the leg base assembly. The seat track assembly may include a first brake coupled to the first rail. The seat track assembly may include a second brake coupled to the second rail. The seat track assembly may include a brake release including a cable coupled to the first brake and the second brake. The brake release may be configured to release the first brake and the second brake to allow the seat track assembly to translate in the first direction In various embodiments, the brake release may further include a first pulley and a second pulley with the cable disposed around the first pulley and the second pulley. The seat base for an aircraft seat may further include a main lever arm configured to move the first pulley away from the second pulley to increase tension in the cable to release the first brake and the second brake. The seat track assembly may further include a third rail and a third brake coupled to the third rail. The seat track assembly may be configured to translate along the third rail in a second direction with respect to the leg base assembly. The brake release may be configured to release the third brake to allow the seat track assembly to translate in the second direction. The cable may be configured to move around the first pulley and the second pulley as the seat track assembly translates in the second direction.

The foregoing features and elements may be combined in various combinations without exclusivity, unless expressly indicated otherwise. These features and elements as well as the operation thereof will become more apparent in light of the following description and the accompanying drawings. It should be understood, however, the following description and drawings are intended to be exemplary in nature and non-limiting.

BRIEF DESCRIPTION OF THE DRAWINGS

The subject matter of the present disclosure is particularly pointed out and distinctly claimed in the concluding portion of the specification. A more complete understanding of the present disclosure, however, may best be obtained by referring to the detailed description and claims when considered in connection with the figures, wherein like numerals denote like elements.

DETAILED DESCRIPTION

All ranges and ratio limits disclosed herein may be combined. It is to be understood that unless specifically stated otherwise, references to "a," "an," and/or "the" may include one or more than one and that reference to an item in the singular may also include the item in the plural.

The detailed description of exemplary embodiments herein makes reference to the accompanying drawings, which show exemplary embodiments by way of illustration. While these exemplary embodiments are described in sufficient detail to enable those skilled in the art to practice the exemplary embodiments of the disclosure, it should be understood that other embodiments may be realized and that logical changes and adaptations in design and construction may be made in accordance with this disclosure and the teachings herein. Thus, the detailed description herein is presented for purposes of illustration only and not limitation. The steps recited in any of the method or process descriptions may be executed in any order and are not necessarily limited to the order presented. Furthermore, any reference to singular includes plural embodiments, and any reference to more than one component or step may include a singular embodiment or step. Also, any reference to attached, fixed, connected or the like may include permanent, removable, temporary, partial, full and/or any other possible attachment option. Additionally, any reference to without contact (or similar phrases) may also include reduced contact or minimal contact. Cross hatching lines may be used throughout the figures to denote different parts but not necessarily to denote the same or different materials.

As used herein, "aft" refers to the direction associated with the tail (e.g., the back end) of an aircraft, or generally, to the direction of exhaust of the gas turbine. As used herein, "forward" refers to the direction associated with the nose (e.g., the front end) of an aircraft, or generally, to the direction of flight or motion.

Systems are disclosed herein that provide for engaging and releasing a brake assembly for an aircraft seat. In accordance with various embodiments, the brake release may reduce the complexity of mechanical components within a seat assembly. An aircraft seat may generally remain in a locked position until a user engages a brake release. When unlocked by a user, the seat may be configured to translate in one or more directions, such as forward, aft, inboard, and/or outboard. A seat track assembly of the seat may include a plurality of linear brakes. The brake release described herein may be configured to release a plurality of brakes to permit movement of the seat in a first direction and in a second direction, which may be perpendicular to the first direction. The brake release may be configured to reduce the quantity of cables and components disposed within the seat base. The systems disclosed herein are suitable for use with various aircraft seat brake assemblies, although there may be utility for use with other brake assemblies.

Figure 1:
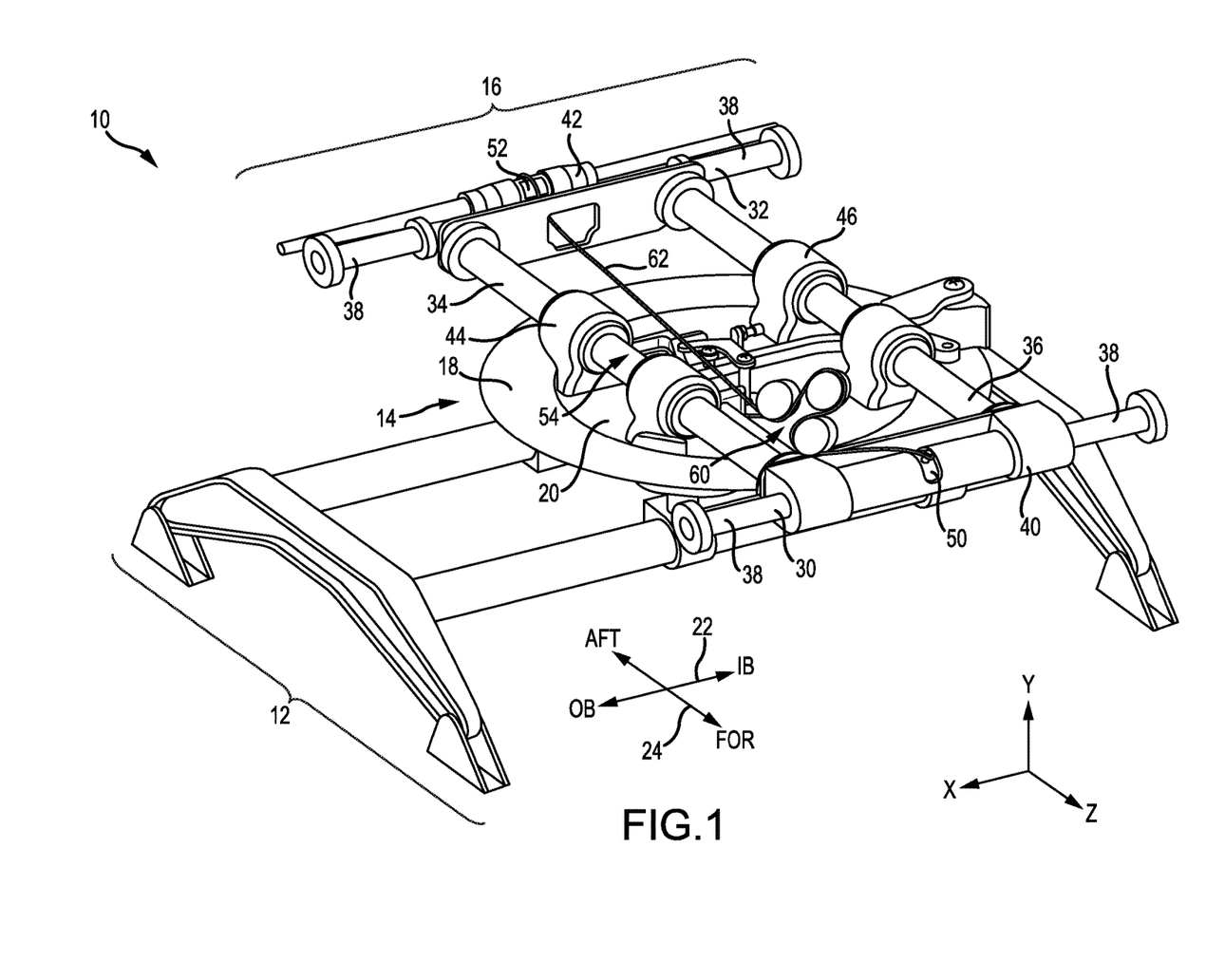
FIG. 1 illustrates an example of an aircraft seat base, in accordance with various embodiments.

With reference now to FIG. 1, a seat base 10 for an aircraft seat is shown, in accordance with various embodiments. Seat base 10 may comprise a leg base assembly 12, a plate assembly 14, and a seat track assembly 16. Leg base assembly 12 of seat base 10 may couple to an aircraft structure, such as the interior floor of an aircraft cabin. Plate assembly 14 may couple to leg base assembly 12. Plate assembly 14 may include a base plate 18 and swivel plate 20. Base plate 18 may rigidly couple to leg base assembly 12, and swivel plate 20 may rotationally couple to base plate 18. Seat track assembly 16 may couple to swivel plate 20 such that seat track assembly 16 and swivel plate 20 rotate with respect to base plate 18 and leg base assembly 12. Thus, seat track assembly 16 may be configured to rotate or swivel via swivel plate 20 in the xz plane on the provided xyz axis and with respect to leg base assembly 12. Seat track assembly 16 may be further configured to translate in the xz plane on the provided xyz axis and with respect to plate assembly 14 and leg base assembly 12. Seat track assembly 16 may translate in the forward (FOR) and aft directions, indicated by arrow 22, and in the inboard (IB) and outboard (OB) directions, indicated by arrow 24.

In the configuration shown in FIG. 1, the outboard direction is illustrated in the positive x-direction, and the inboard direction is illustrated in the negative x-direction on the provided xyz axis. The forward direction is illustrated in the positive z-direction, and the aft direction is illustrated in the negative z-direction on the provided xyz axis. It will be understood that the xyz axis is provided relative to an orientation of the seat track assembly 16 shown in FIG. 1. The translation of seat track assembly 16 may be in directions other than forward/aft and inboard/outboard. For example, in response to seat track assembly 16 swiveling in the xz plane with respect to base plate 18, the directions of translation of seat track assembly 16 would be relative to the orientation of seat track assembly 16 rotated in the xz plane. Further, a measurement point displaced in the positive y-direction from a given reference point may be considered "above" or on "top" of the given reference point. In contrast, a measurement point displaced in the negative y-direction from the given reference point may be considered "below" or on "bottom" of the given reference point. In that regard, the terms "top" and "bottom" or "above" and "below" may refer to relative positions along the y-axis.

In various embodiments, seat track assembly 16 of seat base 10 may comprise a first plurality of rods or rails, such as first rail 30 and second rail 32. First rail 30 may comprise a forward rail and may be disposed in parallel to second rail 32, which may comprise an aft rail. Seat track assembly 16 may further comprise a second plurality of rods or rails, such as third rail 34 and fourth rail 36. Third rail 34 may comprise an outboard rail and may be disposed in parallel to fourth rail 36, which may comprise an inboard rail. Third rail 34 and fourth rail 36 may be disposed perpendicularly to first rail 30 and second rail 32. At least one of the first plurality of rails or second plurality of rails may be configured to mount an aircraft seat. In various embodiments, first rail 30 and second rail 32 may include mounting sites 38 for an aircraft seat to be mounted to seat base 10.

First rail 30 and second rail 32 may be configured to slide outboard in the x-direction and inboard in the negative x-direction on the provided xyz axis, with respect to third rail 34 and fourth rail 36. First rail 30 may slidably couple to third rail 34 and fourth rail 36 by a sleeve 40. Sleeve 40 may be disposed around first rail 30 and may couple to a forward end of third rail 34 and fourth rail 36. First rail 30 may slide within sleeve 40 to translate in the xz plane in the inboard and outboard directions, indicated by arrow 24. Similarly, a sleeve 42 may be disposed around second rail 32 and may couple to and aft end of third rail 34 and fourth rail 36. Second rail 32 may slide within sleeve 42 to translate in the inboard and outboard directions. First rail 30 and second rail 32 may each include a brake, such as first brake 50 or second brake 52, which may be referred to as lateral brakes. First brake 50 and second brake 52 may be linear brakes or linear locking devices that include a locking spring, such as springs 106, 108 (see FIGS. 3A-3B), and an actuation lever, such as levers 96, 98 (see FIGS. 3A-3B). First brake 50 on first rail 30 may restrict linear translation, in the inboard/outboard direction, of first rail 30 with respect to sleeve 40. Second brake 52 on second rail 32 may restrict linear translation, in the inboard/outboard direction, of second rail 32 with respect to sleeve 42.

Third rail 34 and fourth rail 36 may be may be configured to slide forward in the z-direction and aft in the negative z-direction on the provided xyz axis, with respect to the base plate 18 and leg base assembly 12. Third rail 34 may slidably couple to plate assembly 14 by a sleeve 44. Sleeve 44 may be disposed around third rail 34, and third rail 34 may slide within sleeve 44 to translate in the forward and aft directions, indicated by arrow 22. Similarly, sleeve 46 may be disposed around fourth rail 36, and fourth rail 36 may slide within sleeve 46 to translate in the forward and aft directions. Third rail 34 and/or fourth rail 36 may comprise a brake, such as third brake 54, which may be a forward/aft brake. Third brake 54 may restrict forward and aft movement of third rail 34 with respect to sleeve 44. Third rail 34 may be rigidly coupled to fourth rail 36 by sleeves 40, 42 such that third brake 54 also restricts forward and aft movement of fourth rail 36.

In various embodiments, seat track assembly 16 may further include a brake release 60. Brake release 60 may be configured to lock and unlock movement of the seat track assembly 16 in at least one of the forward/aft and inboard/outboard directions. Brake release 60 may be configured to unlock first brake 50 and second brake 52. Brake release 60 may further be configured to unlock third brake 54. Brake release 60 may include a cable 62 coupled to first brake 50 and second brake 52. First brake 50 and second brake 52 may be configured to bias into a locked position. As discussed herein, cable 62 may be coupled to first brake 50 and second brake 52 and configured to unlock first brake 50 and second brake 52 upon engagement of brake release 60. Brake release 60 may further be coupled to third brake 54, which may be biased into a locked position. Brake release 60 may be configured to unlock third brake 54 upon engagement of brake release 60.

Figure 2:
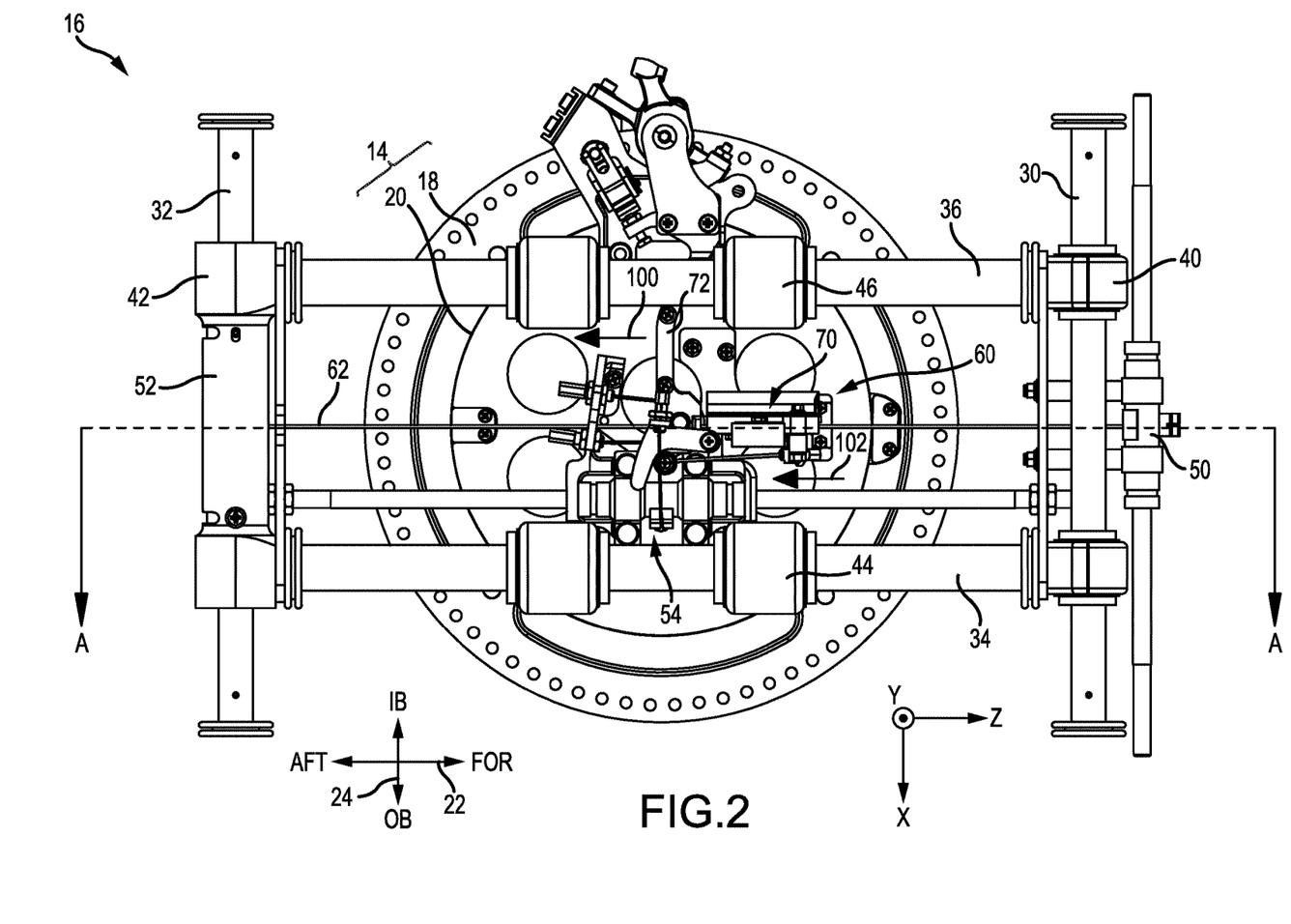
FIG. 2 illustrates an overhead view of a seat track assembly, in accordance with various embodiments.

With reference to FIG. 2, a seat track assembly 16 and a plate assembly 14 is shown, in accordance with various embodiments. Seat track assembly 16 may be coupled to plate assembly 14 and may be configured to translate in the forward and aft directions, indicated by arrow 22, and in the inboard and outboard directions, indicated by arrow 24. Seat track assembly 16 may slide via third rail 34 and fourth rail 36 within sleeves 44, 46 in the forward and aft directions in the xz plane. Seat track assembly 16 may slide via first rail 30 and second rail 32 within sleeves 40, 42 with respect to the inboard and outboard directions in the xz plane. Seat track assembly 16 may include one or more brakes, such as first brake 50, second brake 52 and/or third brake 54. First brake 50 and second brake 52 may lock seat track assembly 16 with respect to movement in the inboard and outboard directions. Third brake 54 may lock seat track assembly 16 with respect to movement in the inboard and outboard directions. Brake release 60 may be configured to simultaneously unlock first brake 50, second brake 52 and third brake 54.

In various embodiments, brake release 60 comprises a pulley assembly 70 and a cable 62. Cable 62 may be coupled to first brake 50, may extend through pulley assembly 70 and may couple to second brake 52. Brake release 60 may further comprise a main lever arm 72. Main lever arm 72 may be configured to move in the direction of arrow 100, or generally in the negative z-direction, in response to an input by a user. Main lever arm 72 may be configured to engage pulley assembly 70 and release first brake 50, second brake 52 and third brake 54. Movement of main lever arm 72 in the direction of arrow 100 may result in a force applied to pulley assembly 70 in the direction of arrow 102, i.e., generally in the negative z-direction. The force on pulley assembly 70 in the direction of arrow 102 may engage brake release 60 to release at least one of first brake 50, second brake 52 and third brake 54.

Figure 3A:
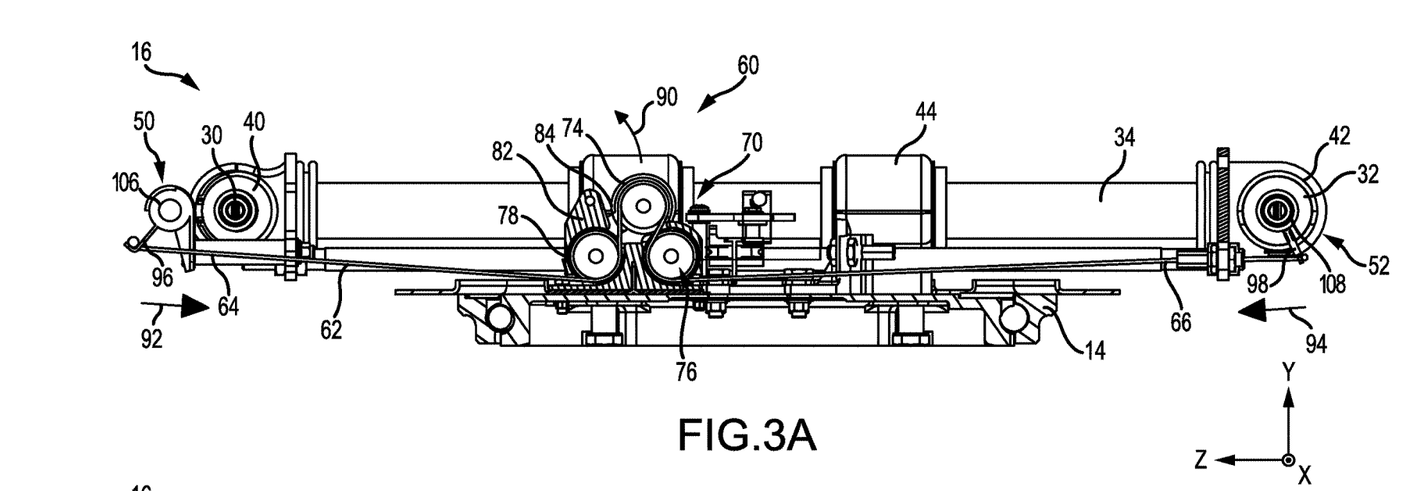
FIG. 3A illustrates a front view of a seat track assembly with a brake release in a locked position, in accordance with various embodiments.
Figure 3B:
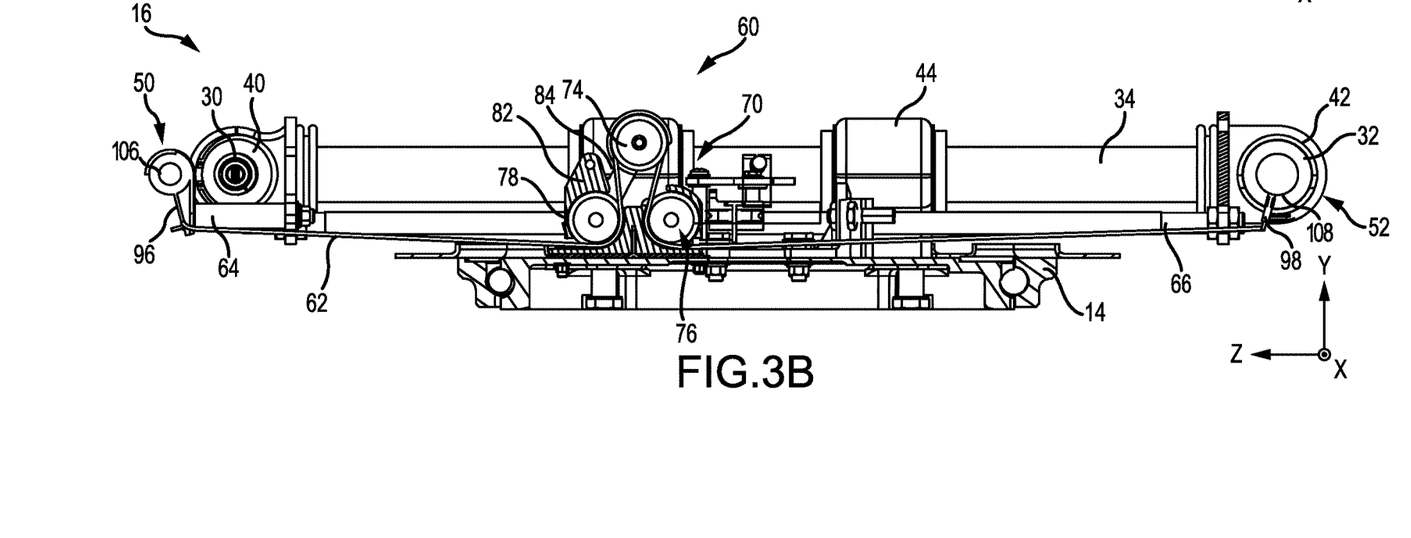
FIG. 3B illustrates a front view of a seat track assembly with a brake release in an unlocked position, in accordance with various embodiments.

FIGS. 3A-3B show cross-sectional views of seat track assembly 16 taken along line A-A in FIG. 2. With reference to FIG. 3A, a seat track assembly 16 is shown with a brake release 60 in a locked position, in accordance with various embodiments. Brake release 60 includes pulley assembly 70 and cable 62. Pulley assembly 70 of brake release 60 may include a pulley frame 80 and one or more pulleys, such as a first pulley 74, a second pulley 76 and a third pulley 78. Pulley frame 80 may include a fixed portion 82 and a pivoting arm 84. A first pulley 74 may be coupled to pivoting arm 84 of pulley frame 80. A second pulley 76 and a third pulley 78 may be coupled to fixed portion 82 of pulley frame 80. Cable 62 may extend from first brake 50 around third pulley 78, first pulley 74 and second pulley 76 and may extend to second brake 52.

In various embodiments, first brake 50 and second brake 52 may include a linear brake or a linear locking device. First brake 50 may include a spring 106 and a lever 96. Spring 106 may bias first brake 50 into a locked position. A first end 64 of cable 62 may couple to lever 96 of first brake 50. With brake release 60 in the disengaged position shown in FIG. 3A, tension is reduced in cable 62, which allows spring 106 to pull lever 96 in the clockwise direction in the yx plane, and first brake 50 remains locked. Second brake 52 may include a spring 108 and a lever 98. Spring 108 may bias second brake 52 into a locked position. A second end 66 of cable 62 may couple to lever 98 of second brake 52. With brake release 60 in the disengaged position shown in FIG. 3A, the reduced tension in cable 62 allows spring 108 to pull lever 98 in the counter-clockwise direction in the yx plane, and second brake 52 remains locked.

In various embodiments, engaging brake release 60 results in increased tension in cable 62, which pulls levers 96, 98 to unlock brakes 50, 52. Brake release 60 may be configured to move pivoting arm 84 in the direction of arrow 90 in response to a force, such as from a user input mechanism (see FIG. 5), acting on pivot arm 84 in generally the counter-clockwise direction in the yz plane. First pulley 74 coupled to pivoting arm 84 also moves in the direction of arrow 90 in response to the force. First pulley 74 moves in the yz plane relative to second pulley 76 and third pulley 78. First pulley 74 moves away from second pulley 76 and third pulley 78. The position of first pulley 74 with respect to second pulley 76 and third pulley 78 may at least partially control the available slack in cable 62. First brake 50 and second brake 52 may be biased in a locked position, such that slack in cable 62 permits first brake 50 and second brake 52 to remain in a locked position. Engaging brake release 60 to move first pulley 74 in the direction of arrow 90 may pull on cable 62 such that a tension in cable 62 increases, thereby reducing slack in cable 62. Pulling slack from cable 62 may pull a first end 64 of cable 62 in the direction of arrow 92, and may pull a second end 66 of cable 62 in the direction of arrow 94 resulting in the unlocked configuration in FIG. 3B.

With reference to FIG. 3B, a seat track assembly 16 is shown with a brake release 60 in an unlocked position, in accordance with various embodiments. Brake release 60 may be engaged to release first brake 50 and second brake 52. In response to a force acting on pivot arm 84 in generally the counter-clockwise direction in the yz plane, pivoting arm 84 moves first pulley 74 into the engaged (unlocked) position shown in FIG. 3B. Pivoting arm 84 moves first pulley 74 in a direction in the yz plane away from second pulley 76 and third pulley 78. The movement of first pulley 74 in generally the positive y-direction pulls cable 62, which pulls first brake 50 and second brake 52 into an unlocked position. First brake 50 may include a lever 96 configured to engage and disengage first brake 50. Lever 96 of first brake 50 may couple to first end 64 of cable 62. Cable 62 may pull lever 96 in the negative z-direction to release (unlock) first brake 50. Second brake 52 may include a lever 98 configured to engage and disengage second brake 52. Lever 98 of second brake 52 may couple to second end 66 of cable 62. Cable 62 may pull lever 98 in the positive z-direction to release (unlock) second brake 52. Thus, movement of first pulley 74 generally in the positive y-direction may simultaneously pull lever 96 and lever 98 to release both first brake 50 and second brake 52.

Figure 4A:
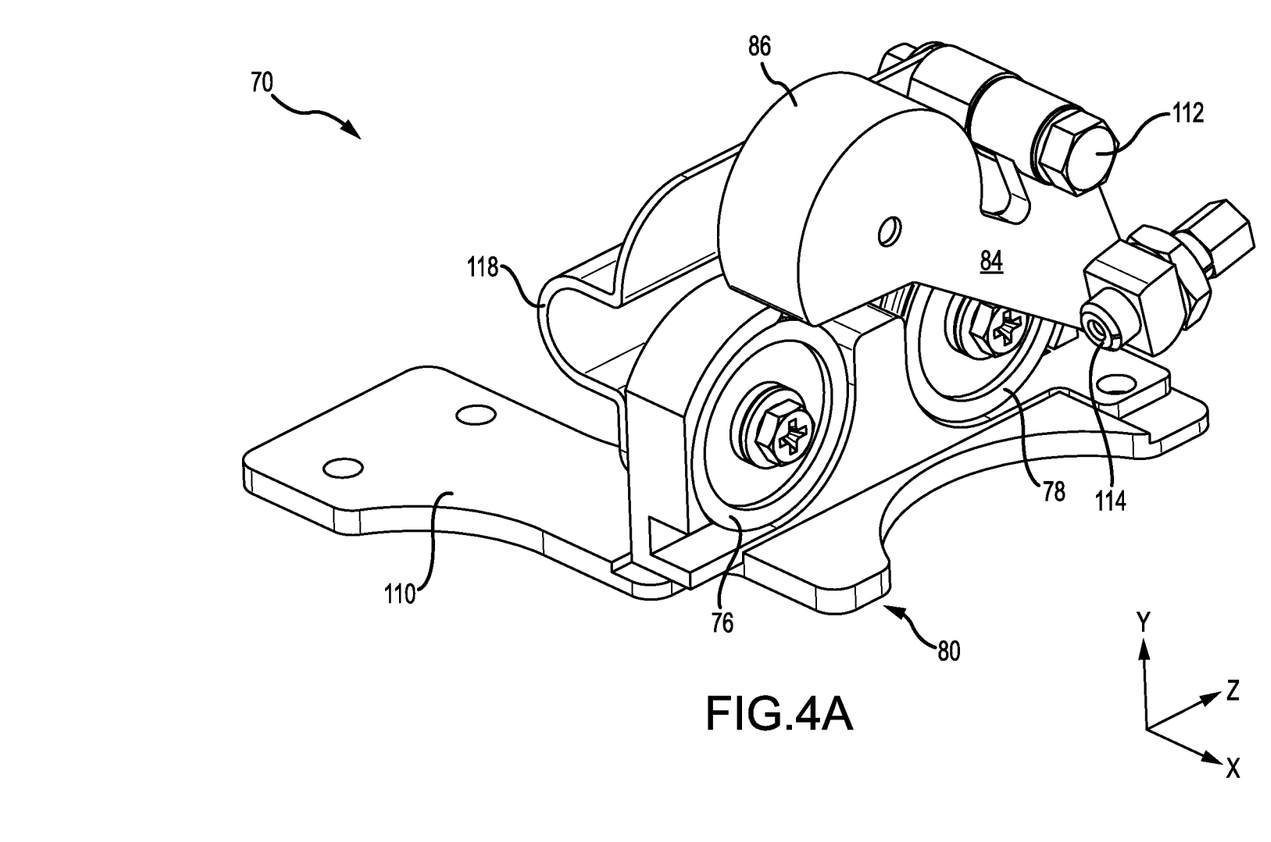
FIG. 4A illustrates a perspective view of a brake release for an aircraft seating track, in accordance with various embodiments.

With reference to FIG. 4A, a pulley assembly 70 of a brake release for an aircraft seating track is shown, in accordance with various embodiments. Pulley assembly 70 may include first pulley 74, second pulley 76 and third pulley 78 each mounted to pulley frame 80. Pulley frame 80 may include fixed portion 82 and pivoting arm 84. With momentary reference to FIGS. 4A and 4B, first pulley 74 may be disposed within or coupled to a housing 86 of pivoting arm 84. Pulley frame 80 may be configured to mount to a seat track assembly 16 (of FIG. 2) by a frame base plate 110. Frame base plate 110 may be configured to rigidly attach to swivel plate 20 of plate assembly 14 (of FIG. 2).

With continued reference to FIG. 4A, pulley frame 80 may include pivoting arm 84 pivotally coupled to fixed portion 82 of pulley frame 80 at joint 112, in accordance with various embodiments. Pivoting arm 84 may further include an actuation cable mount 114. A force, acting on actuation cable mount 114 in generally the negative z-direction, may be applied to pivoting arm 84 at actuation cable mount 114 to pull actuation cable mount 114 in the negative z-direction on the provided xyz axis. In response to the force at actuation cable mount 114, pivoting arm 84 rotates clockwise in the yz plane about joint 112 thereby moving housing 86 (and first pulley 74 within housing 86) in generally the positive y-direction and away from second pulley 76 and third pulley 78. Referring briefly to FIGS. 1 and 4A, pulley assembly 70 may be a compact structure for interfacing with other components within seat base 10. For example, pulley frame 80 may further include a spring guard 118 mounted to fixed portion 82. Brake release 60 may comprise fewer cables than a brake release without pulley assembly 70. Fewer cables allows fewer cable organizing structures to be used within seat base 10 and reduces the physical contact of cables, such as cable 62, with other movable parts and the associated wear on the cables and components of seat base 10.

Figure 4B:
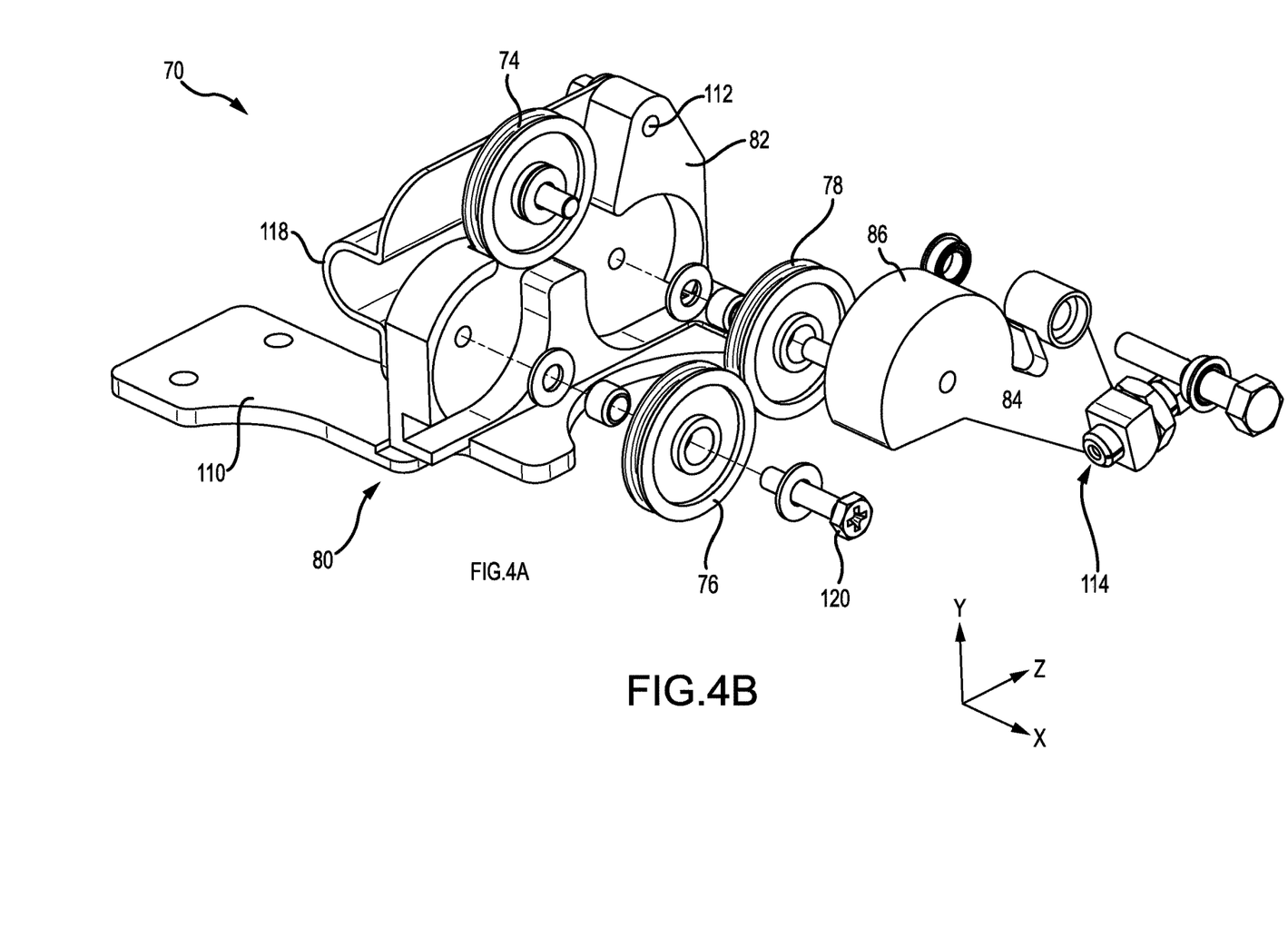
FIG. 4B illustrates an expanded inboard view of a brake release for an aircraft seating track, in accordance with various embodiments.
Figure 4C:
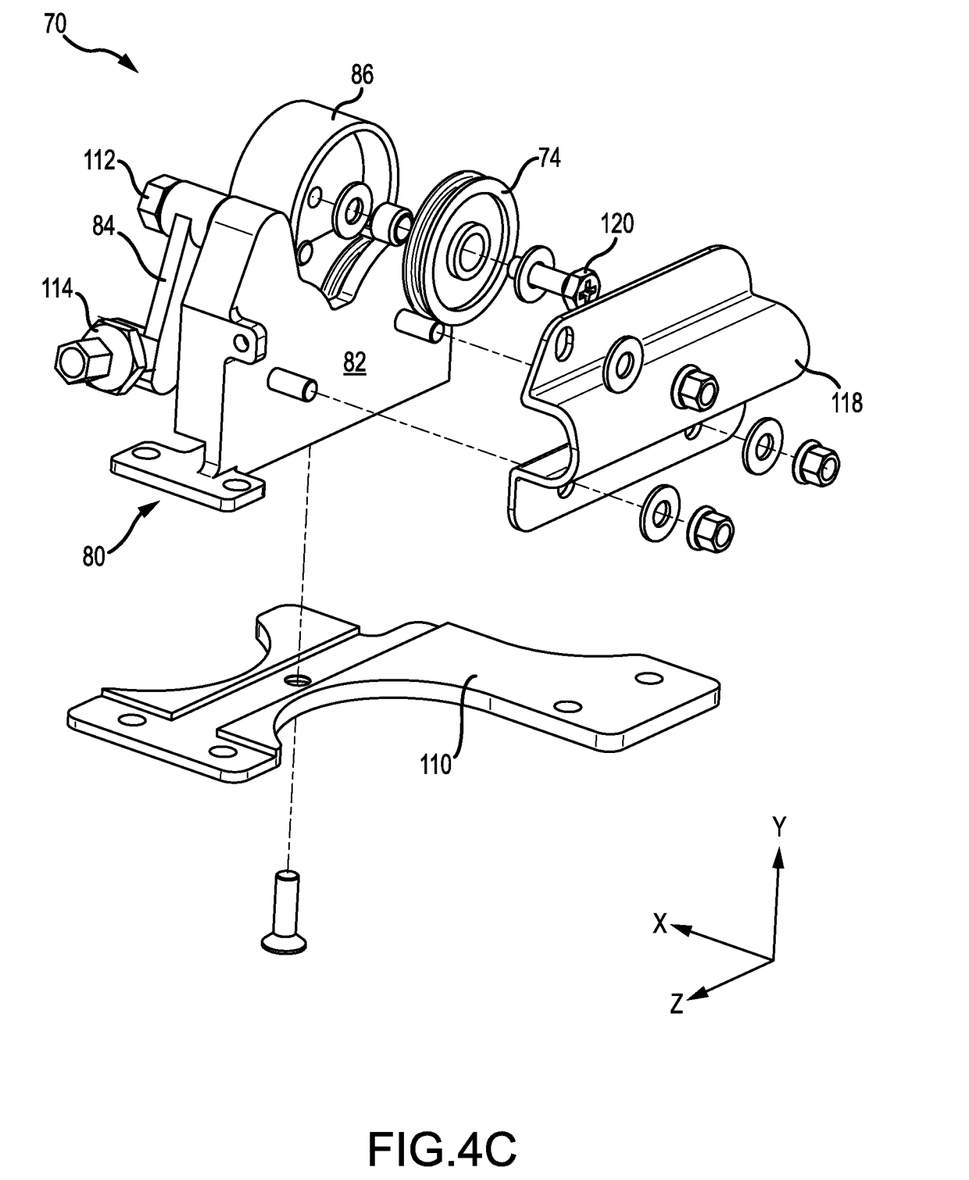
FIG. 4C illustrates an expanded outboard view of a brake release for an aircraft seating track, in accordance with various embodiments.

With reference to FIGS. 4B and 4C, an expanded view of a pulley assembly 70 of a brake release for an aircraft seating track is shown, in accordance with various embodiments. Each of first pulley 74, second pulley 76 and third pulley 78 may be rotatably mounted to pulley frame 80 by a plurality of fasteners 120. Fasteners 120 may include bolts, washers, pins, screws, rivets or other suitable fasteners for mechanically coupling pulleys 74, 76, 78 to pulley frame 80. Pulley assembly 70 may be configured to receive a cable, such as cable 62 from FIGS. 3A-3B. Each of first pulley 74, second pulley 76 and third pulley 78 may be disposed in the same yz plane, such that a cable may be aligned within pulley assembly 70 in the same yz plane as pulleys 74, 76, 78. In various embodiments, pulley assembly 70 may comprise at least one of steel, stainless steel, aluminum, aluminum alloy, titanium, titanium alloy, composite, or a polymeric material.

Figure 5:
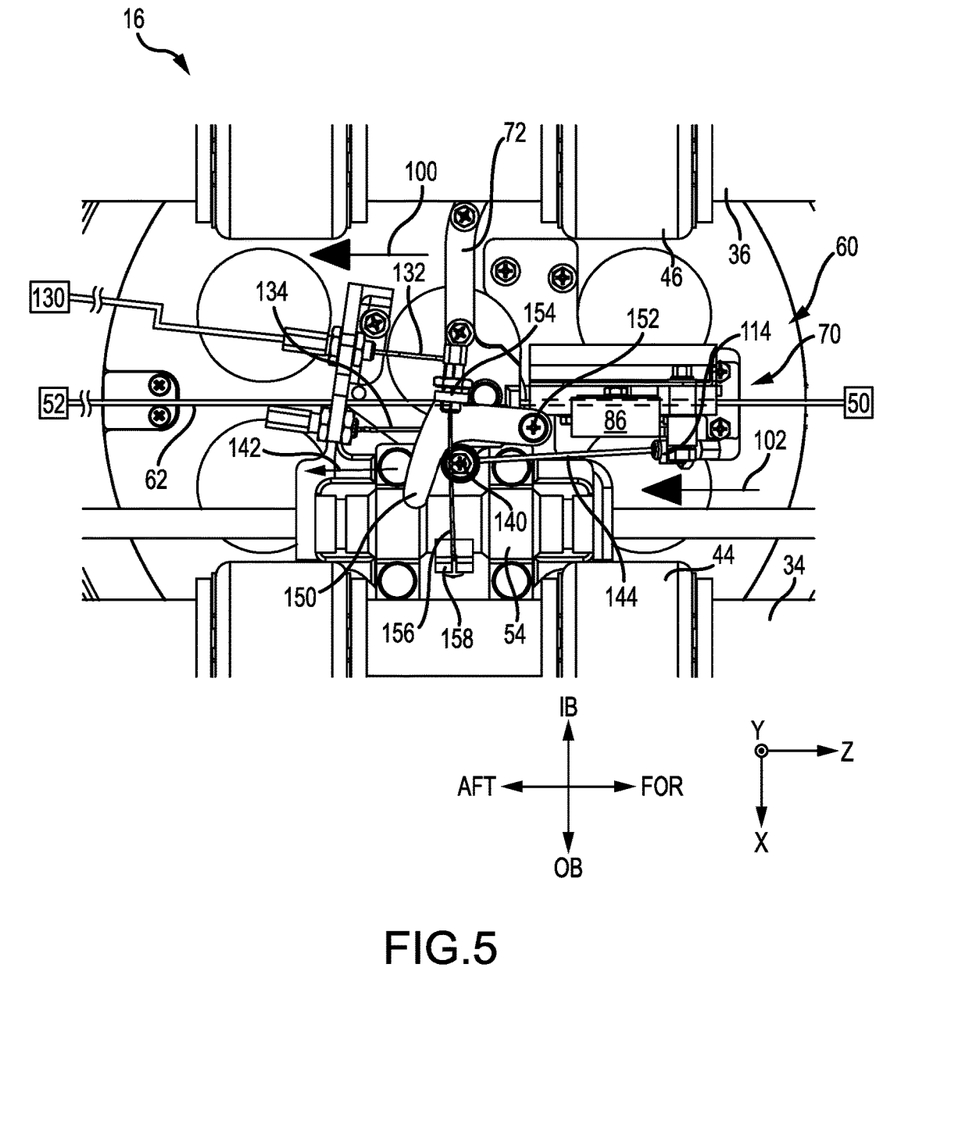
FIG. 5 illustrates an overhead view of a seat track assembly in accordance with various embodiments.

With reference to FIG. 5, a portion of seat track assembly 16 with a brake release 60 is shown, in accordance with various embodiments. Brake release 60 includes pulley assembly 70 and cable 62, wherein cable 62 may comprise a single cable extending from second brake 52 through pulley assembly 70 to first brake 50. Brake release 60 may be operated by a user through a user input mechanism 130 (shown schematically) coupled to the aircraft seat. The user may operate the user input mechanism 130, which may be, for example a lever or switch operated by mechanical, electrical, electromechanical, pneumatic and/or other control scheme. For example, the user may manipulate user input mechanism 130 which acts on main lever arm 72 through one or more input cables, such as input cable 132 and/or input cable 134. At least one of input cable 132 and input cable 134 may pull main lever arm 72 laterally aft in the xz plane in the direction of arrow 100. As will be discussed, main lever arm 72 may be configured to simultaneously release first brake 50, second brake 52 and third brake 54.

In various embodiments, a bearing 140 may be coupled to main lever arm 72, such that bearing 140 moves with main lever arm 72 in the same direction as main lever arm 72, which is pulled in the direction of arrow 100 by input cables 132, 134. Thus, bearing 140 may move laterally aft in the xz plane in the direction of arrow 142 in response to the user engaging user input mechanism 130. Bearing 140 may mechanically interface with pulley assembly 70 through a first actuation cable 144. First actuation cable 144 may extend from bearing 140 to pulley assembly 70. First actuation cable 144 may be configured to mechanically couple to bearing 140 and to actuation cable mount 114 of pulley assembly 70. A first end of first actuation cable 144 may be coupled to bearing 140, and a second end of first actuation cable 144 may couple to actuation cable mount 114. As bearing 140 moves in the direction of arrow 142, bearing 140 pulls first actuation cable 144 and actuation cable mount 114 laterally aft in the xz plane in the direction of arrow 102.

Figure 6A:
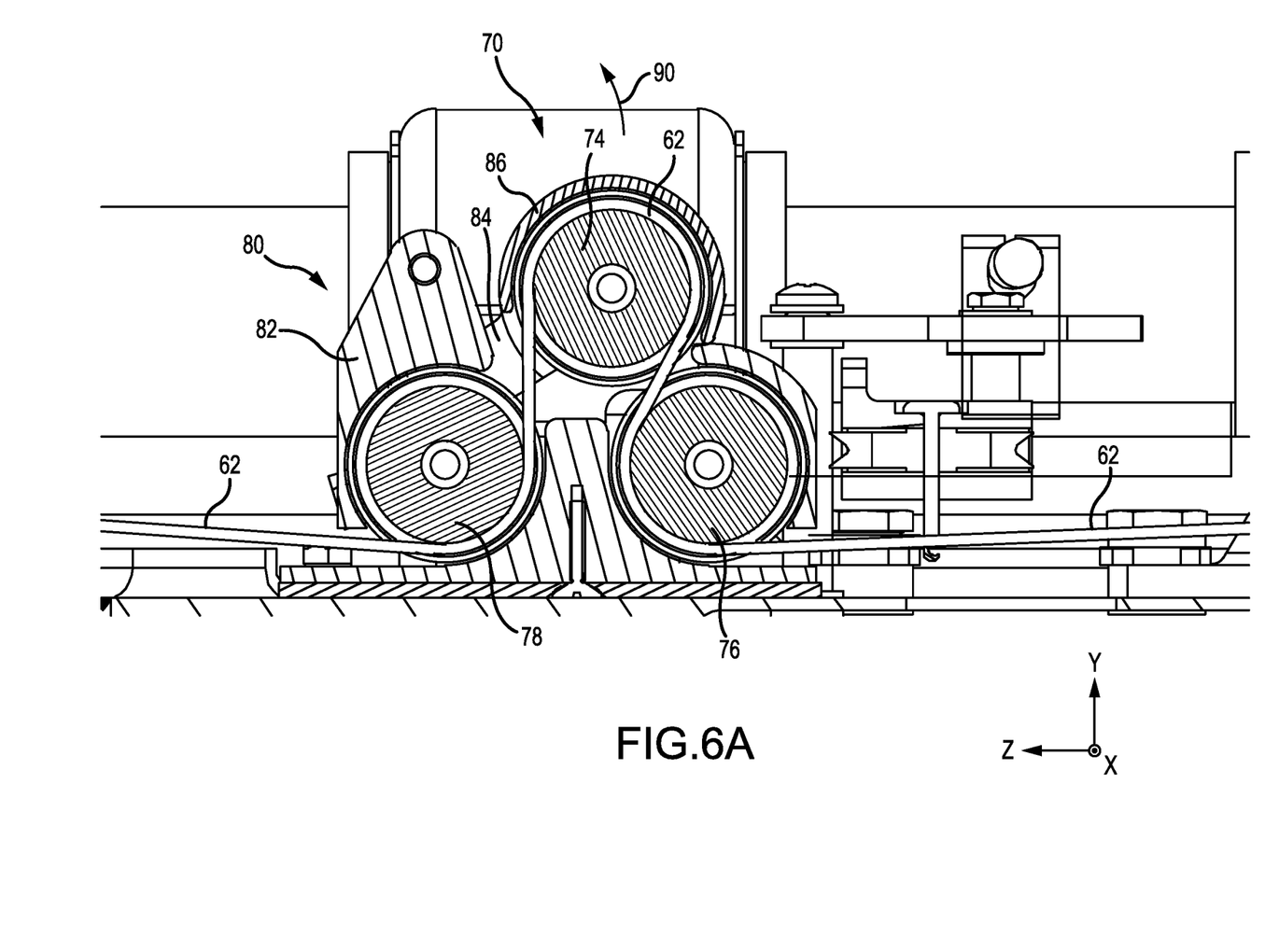
FIG. 6A illustrates a front view of a pulley assembly of a brake release in a locked position, in accordance with various embodiments.

Referring now to FIG. 6A and still to FIG. 5, as actuation cable mount 114 moves in the direction of arrow 102 in FIG. 5, pivoting arm 84 rotates counterclockwise in the yz plane with respect to the view in FIG. 6A. Thus, pivoting arm 84 of pulley frame 80 may be coupled to or in mechanical communication with main lever arm 72 through actuation cable mount 114, first actuation cable 144 and bearing 140. Main lever arm 72 may be configured to move pivoting arm 84 and housing 86, such that first pulley 74 moves away from second pulley 76 and third pulley 78. Housing 86 and first pulley 74 move upward in the generally the positive y-direction, in the direction of arrow 90 in FIG. 6A, in response to the force from first actuation cable 144 acting on actuation cable mount 114 (see FIG. 5). During engagement of brake release 60, main lever arm 72 moves first pulley 74 to the unlocked position, away from second pulley 76 and third pulley 78, as shown in FIG. 6B.

Figure 6B:
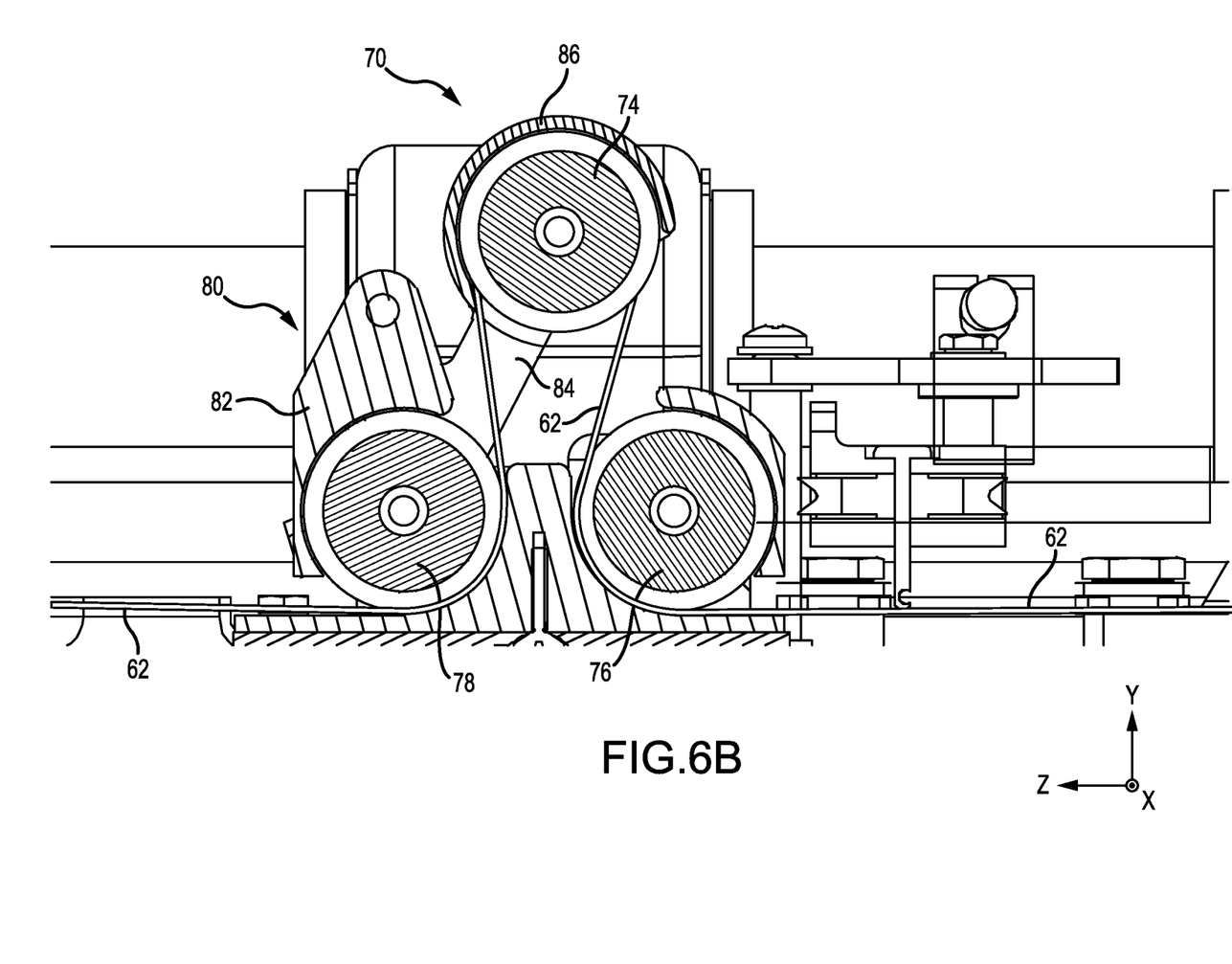
FIG. 6B illustrates a front view of a pulley assembly of a brake release in an unlocked position, in accordance with various embodiments.

Referring now to FIG. 6B and still to FIG. 5, first pulley 74 may pull on cable 62 and may increase tension in cable 62. Cable 62 may pull first brake 50 and second brake 52 into the released (unlocked) position. Thus, main lever arm 72 may be coupled to or in mechanical communication with first brake 50 and second brake 52 through bearing 140, first actuation cable 144, actuation cable mount 114, pivoting arm 84, first pulley 74 and cable 62. With first brake 50 and second brake 52 in the unlocked position, seat track assembly 16 may be permitted to translate laterally in the xz plane, which may be in the inboard and outboard directions according to the orientation illustrated in FIG. 5.

Returning to FIG. 5, brake release 60 may also release third brake 54. As discussed, main lever arm 72 moves bearing 140 in response to a user input, which pulls main lever arm 72 in the direction of arrow 100. Bearing 140 of brake release 60 may interface with a lever 150, which may be configured to rotate about a joint 152 in response to bearing 140 pushing against lever 150. Lever 150 may have a boomerang shape, or other shape suitable for interfacing with bearing 140. Bearing 140 may be seated along an inner curved edge of lever 150, and may be configured to slide or roll along the inner curved edge of lever 150. Lever 150 may be configured to rotate in a clockwise direction in the xz plane about joint 152 in response to a force from bearing 140 in the direction of arrow 142, shown in the negative z-direction. A cable mount 154 may be coupled to or integrally formed with lever 150. The rotation of lever 150 may move cable mount 154 in generally the negative x-direction in the xz plane. A second actuation cable 156 may couple to cable mount 154 on lever 150. Second actuation cable 156 may extend from cable mount 154 to third brake 54. The rotation of lever 150 with cable mount 154 may pull cable second actuation cable 156. Third brake 54 may include a lever 158 coupled to second actuation cable 156 and configured to engage and disengage third brake 54. Second actuation cable 156 may pull lever 158 in the negative x-direction to release (unlock) third brake 54. Thus, bearing 140 moves in the direction of arrow 142 causing lever 150 to rotate and cable mount 154 to pull on second actuation cable 156, which pulls lever 158 to release third brake 54.

The movement of main lever arm 72 in the negative z-direction may simultaneously pull first actuation cable 144, which releases first brake 50 and second brake 52, and second actuation cable 156, which releases third brake 54. With third brake 54 in the unlocked position, seat track assembly 16 may be permitted to translate forward and aft in the xz plane. Thus, with first brake 50, second brake 52 and third brake 54 each in the unlocked position, seat track assembly 16 may be permitted to translate in a plurality of linear directions, including first direction, such as inboard or outboard, and a second direction, such as forward or aft. The first direction of translation may be perpendicular to the second direction of translation.

Referring momentarily to FIG. 6B and still to FIG. 5, as seat track assembly 16 translates forward or aft, cable 62 may slide through pulley assembly 70. Pulley assembly 70 may be configured to allow cable 62 to move in the forward and aft directions with respect to pulley assembly 70. Thus, as third rail 34 and fourth rail 36 translate in the forward and aft directions, cable 62 also translates forward and aft with third rail 34 and fourth rail 36. Cable 62 slides through pulley assembly 70 by moving around pulleys 74, 76, 78 to translate in the forward and aft directions.

First brake 50, second brake 52 and third brake 54 may tend to remain in a locked position until a user engages brake release 60. The user may engage user input mechanism 130 to engage (unlock) brake release 60 and unlock brakes 50, 52, 54. When first brake 50, second brake 52 and third brake 54 are unlocked by brake release 60, the user may select a seat position by sliding or translating the aircraft seat in the forward/aft direction and/or the inboard/outboard direction. The user may release user input mechanism 130 to disengage (lock) brake release 60 and allow brakes 50, 52, 54 to return to a locked position.

Referring again to FIGS. 5 and 6B and also to FIGS. 1 and 3B and in accordance with various embodiments, a user engages brake release 60 through user input mechanism 130. An input from a user through user input mechanism 130 to engage brake release 60 results in the release of first brake 50, second brake 52 and third brake 54. User input mechanism 130 pulls input cable 132 and/or input cable 134, which pulls main lever arm 72. Main lever arm 72 moves bearing 140. Bearing 140 pulls first actuation cable 144, which rotates pivoting arm 84. The rotation of pivoting arm 84 moves housing 86 and first pulley 74. First pulley 74 which pulls cable 62 to increase tension in cable 62, which pulls lever 96 of first brake 50 and lever 98 of second brake 52 to release first brake 50 and second brake 52. Bearing 140 also pushes lever 150, which rotates and moves cable mount 154. Cable mount 154 pulls second actuation cable 156, which pulls lever 158 to release third brake 54. Upon engagement of brake release 60, the user may slide the seat in one or more linear directions. The seat track assembly 16 may translate in a first direction parallel to first rail 30 and second rail 32 with respect to leg base assembly 12. The seat track assembly 16 may translate in a second direction parallel to third rail 34 and fourth rail 36 with respect to leg base assembly.

A user may disengage brake release 60 to lock the seat in place with respect to leg base assembly 12. An input from a user through user input mechanism 130 to release or disengage brake release 60 results in the re-engagement of first brake 50, second brake 52 and third brake 54. Input cable 132 and/or input cable 134 allow main lever arm 72 to return to a neutral, disengaged position, thereby reducing tension in first actuation cable 144 and second actuation cable 156. First brake 50, second brake 52 and third brake 54 may be configured to bias to a locked position. Reducing tension in second actuation cable 156 allows lever 158 to re-engage third brake 54, thereby locking third brake 54. Reducing tension in first actuation cable 144 allows pivoting arm 84 and first pulley 74 of pulley assembly 70 to return to a neutral position. As first pulley 74 moves toward second pulley 76 and third pulley 78, the tension in cable 62 is reduced. Reducing tension in second actuation cable 156 allows lever 96 to re-engage first brake 50 and allows lever 98 to re-engage second brake 52, thereby locking first brake 50 and second brake 52. While in the engaged (locked) position, brakes 50, 52, and 54 restrict movement of seat track assembly 16, such that an aircraft seat coupled to seat track assembly 16 remains in a fixed position with respect to leg base assembly 12.

The present disclosure describes a seat base having a brake release. Such brake release assemblies may be used in aircraft seats. However, the systems and methods of the present disclosure may be suitable for use in non-aircraft seats as well. In various embodiments, the brake release assemblies described herein may be used with any suitable aircraft and/or vehicle with seats (e.g., a commercial aircraft, a military aircraft, a helicopter, a motor vehicle, and/or the like).

Benefits and other advantages have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, and any elements that may cause any benefit or advantage to occur or become more pronounced are not to be construed as critical, required, or essential features or elements of the disclosure. The scope of the disclosure is accordingly to be limited by nothing other than the appended claims, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C.

Systems, methods and apparatus are provided herein. In the detailed description herein, references to "various embodiments", "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Furthermore, no element, component, or method step in the present disclosure is intended to be dedicated to the public regardless of whether the element, component, or method step is explicitly recited in the claims. No claim element is intended to invoke 35 U.S.C. 112(f) unless the element is expressly recited using the phrase "means for." As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. A brake release, comprising:
a pulley frame including a fixed portion and a pivoting arm;
a first pulley coupled to the pivoting arm of the pulley frame;
a second pulley coupled to the fixed portion of the pulley frame;
a cable disposed around the first pulley and the second pulley and coupled to a first brake and a second brake; and
a main lever arm coupled to the pivoting arm of the pulley frame, wherein the main lever arm is configured to move the first pulley away from the second pulley and to pull the cable to release the first brake and the second brake.

2. The brake release of claim 1, further including a bearing coupled to the main lever arm, wherein the bearing is coupled to the pivoting arm by a first actuation cable.

3. The brake release of claim 2, wherein the first actuation cable is configured rotate the pivoting arm and move the first pulley.

4. The brake release of claim 3, wherein the bearing is coupled to a third brake by a second actuation cable.

5. The brake release of claim 4, wherein the main lever arm is configured to release the third brake by pulling the second actuation cable.

6. The brake release of claim 1, further including a third pulley, the cable disposed around the third pulley.

7. The brake release of claim 6, wherein the cable is configured move around the first pulley, the second pulley and the third pulley.

8. A seat track assembly, comprising:
a first rail disposed in parallel to a second rail;
a first brake coupled to the first rail;
a second brake coupled to the second rail;
a brake release coupled to the first brake and the second brake, the brake release including:
a pulley assembly including a pivoting arm, a first pulley, and a second pulley;
a cable disposed around the first pulley and the second pulley, and through the pulley assembly and coupled to the first brake and the second brake; and
a main lever arm coupled to the pivoting arm, wherein the main lever arm is configured to increase tension in the cable to release the first brake and the second brake; and wherein the main lever arm is configured to move the first pulley away from the second pulley to increase tension in the cable.

9. The seat track assembly of claim 8, further including:
a third rail disposed perpendicularly to the first rail and the second rail; and
a third brake coupled to the third rail.

10. The seat track assembly of claim 9, wherein the brake release is coupled to the third brake and wherein the main lever arm is configured to release the third brake.

11. The seat track assembly of claim 8, wherein the cable is configured to translate through the pulley assembly in a first direction.

12. The seat track assembly of claim 8, wherein at least one of the first brake or the second brake comprises a linear brake.

13. A seat base for an aircraft seat, comprising:
a seat track assembly slidably coupled to a leg base assembly, the seat track assembly including,
a first rail disposed in parallel to a second rail, the seat track assembly configured to translate along the first rail and the second rail in a first direction with respect to the leg base assembly,
a first brake coupled to the first rail,
a second brake coupled to the second rail, and
a brake release including a cable coupled to the first brake and the second brake, wherein the brake release is configured to release the first brake and the second brake to allow the seat track assembly to translate in the first direction,
wherein the brake release includes a first pulley and a second pulley with the cable disposed around the first pulley and the second pulley; and
a main lever arm configured to move the first pulley away from the second pulley to increase tension in the cable to release the first brake and the second brake.

14. The seat base of claim 13, wherein the seat track assembly further includes a third rail and a third brake coupled to the third rail, the seat track assembly configured to translate along the third rail in a second direction with respect to the leg base assembly.

15. The seat base of claim 14, wherein the brake release is configured to release the third brake to allow the seat track assembly to translate in the second direction.

16. The seat base of claim 15, wherein the cable is configured to move around the first pulley and the second pulley as the seat track assembly translates in the second direction.

\* \* \* \* \*